US006859006B2

(12) United States Patent
Hayashi

(10) Patent No.: US 6,859,006 B2
(45) Date of Patent: Feb. 22, 2005

(54) POSITION CONTROL SYSTEM FOR USE IN DRIVING SYSTEM TRANSMITTING DRIVING FORCE OF DRIVING SOURCE TO DRIVEN MEMBER THROUGH POWER TRANSMISSION MECHANISM, IMAGE FORMING APPARATUS, POSITION CONTROL METHOD, PROGRAM FOR PERFORMING THE POSITION CONTROL METHOD, AND STORAGE MEDIUM HAVING THE PROGRAM STORED THEREON

(75) Inventor: Tadashi Hayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 10/419,537

(22) Filed: Apr. 21, 2003

(65) Prior Publication Data

US 2003/0202821 A1 Oct. 30, 2003

(30) Foreign Application Priority Data

Apr. 24, 2002 (JP) ....................................... 2002-122951
Apr. 2, 2003 (JP) ....................................... 2003-099586

(51) Int. Cl.[7] ................................................ G05B 11/42
(52) U.S. Cl. ........................ 318/610; 318/621; 318/632
(58) Field of Search .............................. 318/567, 568.1, 318/568.22, 568.23, 599, 600, 609, 610, 621, 632

(56) References Cited

U.S. PATENT DOCUMENTS

| | | | | |
|---|---|---|---|---|
| 4,563,735 A | * | 1/1986 | Hiroi et al. | 700/45 |
| 5,801,939 A | * | 9/1998 | Okazaki | 700/56 |
| 5,915,401 A | * | 6/1999 | Menard et al. | 137/12 |
| 6,272,401 B1 | * | 8/2001 | Boger et al. | 700/282 |

* cited by examiner

*Primary Examiner*—Bentsu Ro
(74) *Attorney, Agent, or Firm*—Cowan, Liebowitz & Latman, P.C.

(57) ABSTRACT

A position control method for accurate position control of a driving source is disclosed. The method of the present invention comprises the steps of comparing a remaining driving amount of the driving source to a target position with a mechanical dead zone of a power transmission mechanism, controlling the position of the driving source by a proportional and derivative operation on a deviation of the position detected by the position detection circuit from a command position obtained from a speed command value while the remaining driving amount is larger than the mechanical dead zone, and controlling the position of the driving source by a proportional, integral, and derivative operation on the deviation of the position detected by the position detection circuit from the command position obtained from the speed command value when the remaining driving amount becomes smaller than the mechanical dead zone.

30 Claims, 13 Drawing Sheets

POSITION CONTROL SYSTEM FOR USE IN DRIVING SYSTEM TRANSMITTING DRIVING FORCE OF DRIVING SOURCE TO DRIVEN MEMBER THROUGH POWER TRANSMISSION MECHANISM, IMAGE FORMING APPARATUS, POSITION CONTROL METHOD, PROGRAM FOR PERFORMING THE POSITION CONTROL METHOD, AND STORAGE MEDIUM HAVING THE PROGRAM STORED THEREON

BACKGROUND OF THE INVENTION

Field of the Invention

The present invention relates to a position control system for use in a driving system which transmits driving force of a driving source to a driven member through a power transmission mechanism, a position control method, a program for performing the position control method, and a storage medium which has the program stored thereon.

A power transmission mechanism is often provided between a driving source and a driven member. Especially when position control is performed on a driven member (a load) which has relatively large inertia such as a developer unit switcher in a multicolor image forming apparatus such as a printer, a power transmission mechanism such as a gear train connects a motor serving as a driving source to a load in many cases in consideration of the efficiency, arrangement and the like of the motor. This is often the case with a DC motor used as the driving source since high efficiency is achieved in driving at a high speed.

The power transmission mechanism always involves a so-called mechanical dead zone (hereinafter referred to as "play") such as backlash and rattle in a gear train. When a position detector such as a rotary encoder is directly connected to the load, a control system is likely to operate unstably due to the play in the gear train or the like. Also, the encoder needs to deal with pulses at a high frequency to provide a required resolution, thereby causing a higher cost. To avoid these situations, the position detector is often connected to the motor shaft. This is called a semi-closed control system.

To perform position control with high accuracy and little noise, a method of controlling a motor based on speed table is often used, for example in Japanese Patent Application Laid-Open No. 1982-132797.

Various techniques have been proposed for control methods. Of the techniques, Proportional-Integral-Derivative control (hereinafter referred to as "PID control" and, Proportional, Integral, and Derivative are abbreviated as "P," "I," and "D," respectively) is often used due to readiness of design and adjustment and no need for special hardware, as proposed in Japanese Patent Application Laid-Open No. 1997-128033. Ideal speed values of a motor until the motor reaches a target position are stored as a speed table, and a deviation of the actual speed value of the motor from the speed value read from the speed table is corrected through the PID control.

As described above, the power transmission mechanism has play therein. For example, when the power transmission mechanism is used to drive a driven member which has relatively large inertia, for example a developer unit switcher in a multicolor image forming apparatus, a large reduction ratio is set and thus the play is increased. In consideration of a deviation caused by the play, it is desirable that the masses of the driving source and the driven member are not separated from each other immediately before the driving source stops in order to enhance the accuracy at the stop position of the driven member.

When such a driving system is subjected to position control through the PID control in the semi-closed system, vibrations may easily occur if a high integral gain is used to seek quick elimination of the deviation of the actual driving position of the motor from the target position obtained from the speed table.

With a high integral gain, if the actual driving position of the motor moves even a little ahead of the position obtained on the basis of the speed table, the motor tries to reverse the direction. On the other hand, the driven member tries to continue moving in the same direction by its inertia. Since the power transmission mechanism has the play, a collision occurs between the motor trying to reverse the direction and the driven member trying to continue moving by inertia.

This situation is likely to be seen when a sampling rate for detecting the driving position of the motor is not sufficiently high as compared with the driving speed of the motor. Typically, the speed table is set such that the driving speed of the motor is gradually increased, and then gradually reduced as the motor approaches the target position. Thus, at positions except for near the start and the stop of driving when the motor is driven at a low speed, collisions and separations may be repeated to produce large vibrations if the integral gain is high. However,if the integral gain is reduced to suppress the vibrations, convergence for stopping the motor and the driven member may take a long time or the residual may be large.

SUMMARY OF THE INVENTION

According to an aspect, the present invention provides a position control method for use in a driving apparatus comprising a driving source which drives a driven member through a power transmission mechanism and a position detection circuit which detects a driving position of the driving source and outputting a speed command value to the driving source to perform speed control, the method of performing control such that the position detected by the position detection circuit reaches a target position. In the method, the position of the driving source is controlled by performing a proportional and derivative operation on the deviation of the position detected by the position detection circuit from a command position derived on the basis of the speed command value while the remaining driving amount of the driving source to the target position is larger than the amount of the mechanical dead zone of the power transmission mechanism. When the remaining driving amount becomes smaller than the amount of the mechanical dead zone of the power transmission mechanism, the position of the driving source is controlled by performing a proportional, integral, and derivative operation on the deviation.

According to another aspect, the present invention provides a position control method for use in a driving apparatus comprising a driving source which drives a driven member through a power transmission mechanism and a position detection circuit which detects a driving position of the driving source and outputting a speed command value to the driving source to perform speed control, the method of performing control such that the position detected by the position detection circuit reaches a target position. In the method, the position of the driving source is, controlled by performing a proportional, integral, and derivative operation on the deviation of the position detected by the position detection circuit from a command position derived on the basis of the speed command value. The gain of the integral value when the remaining driving amount of the driving source to the target position is smaller than the amount of the mechanical dead zone of the power transmission mechanism is set to be higher than when the remaining driving amount is larger than the amount of the mechanical dead zone.

According to yet another aspect, the present invention provides a position control method for use in a driving apparatus comprising a driving source which drives a driven member through a power transmission mechanism and a position detection circuit which detects a driving position of the driving source and outputting a speed command value to the driving source to perform speed control, the method of performing control such that the position detected by the position detection circuit reaches a target position. In the method, the position of the driving source is controlled by performing a proportional, integral, and derivative operation on the deviation of the position detected by the position detection circuit from a command position derived on the basis of the speed command value. The upper limit on the integral value when the remaining driving amount of the driving source to the target position is smaller than the amount of the mechanical dead zone of the power transmission mechanism is set to be higher than when the remaining driving amount is larger than the amount of the mechanical dead zone.

Other objects and advantages besides those discussed above shall be apparent to those skilled in the art from the description of preferred embodiments of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

A detailed configuration of the position control system for use in driving system transmitting driving force of driving source to driven member through power transmission mechanism, image forming apparatus, position control method, and strage medium having the program stored thereon of the invention, the above and other objects and features of the invention will be apparent from the embodiment, described below.

BRIEF DESCRIPTION OF THE DRAWINGS

FIG. 7 is a block diagram showing in detail the structure of

DETAILED DESCRIPTION OF THE PREFERRED EMBODIMENT

Hereinafter, the preferred embodiment of the invention will be described in detail with reference to the drawings.

Figure 1:
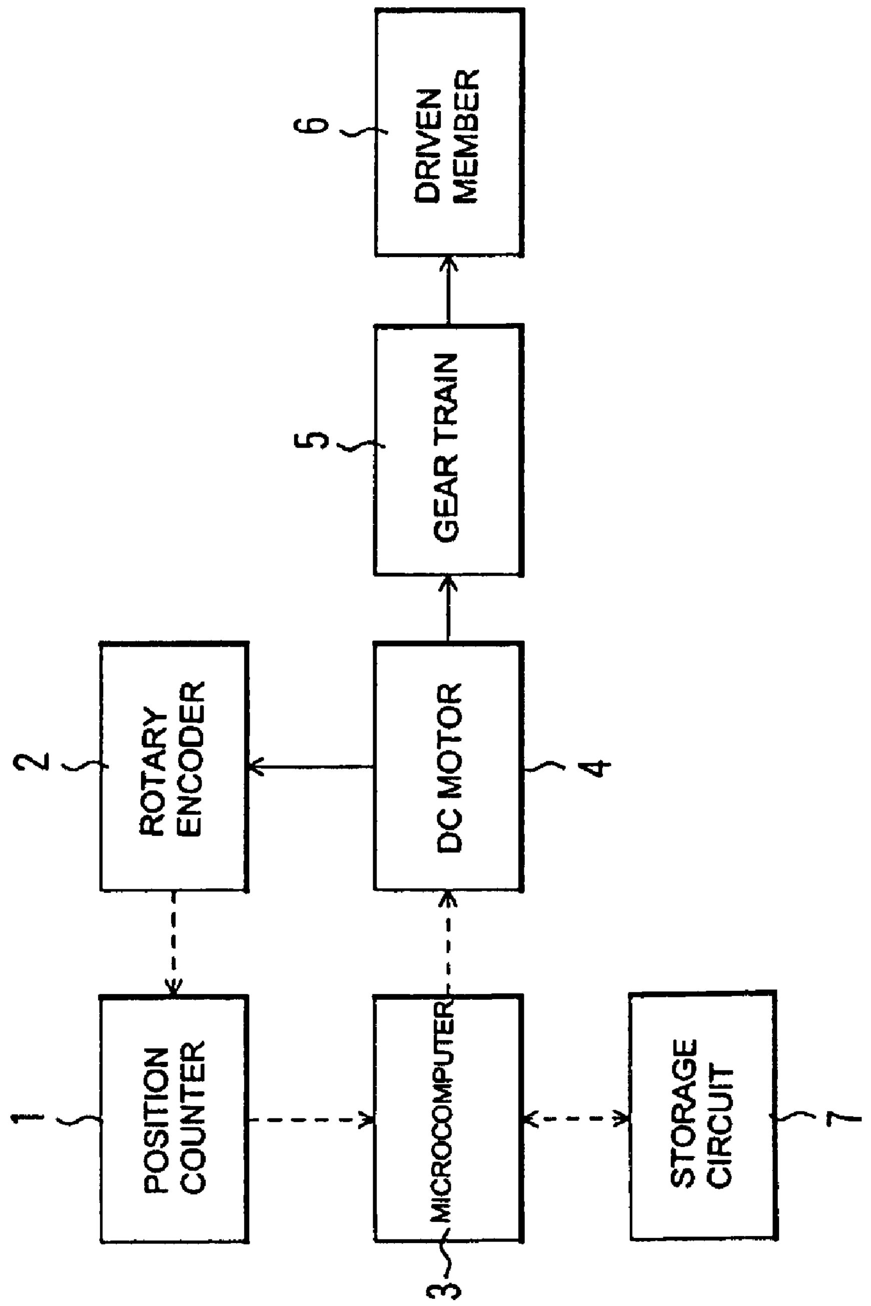
FIG. 1 is a block diagram schematically showing the structure of a position control system which is a first embodiment.
Figure 2:
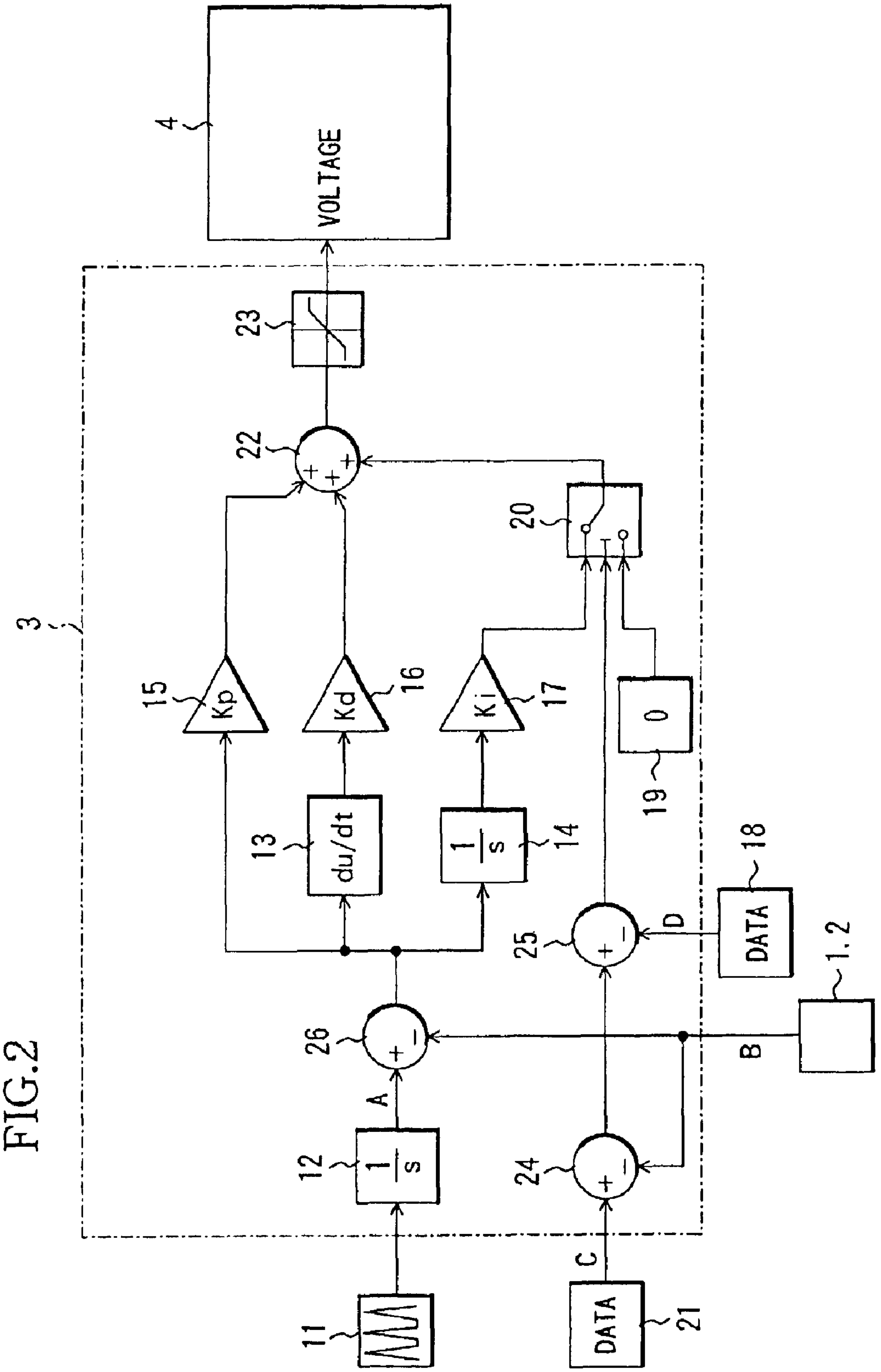
FIG. 2 is a block diagram showing in detail the structure of the position control system which is the first embodiment of the present invention, with a microcomputer shown in particular.

FIG. 1 shows a block diagram showing a position control system which is a first embodiment of the present invention. FIG. 2 is a block diagram showing in detail a control circuit of the position control apparatus, with a microcomputer shown in particular.

In FIG. 1, electrical connections and mechanical connections between components are shown by dotted lines and solid lines, respectively. A rotary encoder 2 serving as a position sensor is directly connected to the shaft of a DC motor 4 without interposing any transmission mechanism between them. The rotary encoder 2 outputs a pulse signal which includes information about a direction of rotation. The pulse signal is up/down counted by a position counter 1 to provide information about a driving position (an amount of rotation) of the motor 4.

A gear train (including a single gear train) 5 serving as a power transmission mechanism decelerates the rotation produced by the motor 4 and increases torque. The gear train 5 has play as a mechanical dead zone. The substantially accurate amount of the play can be known by making measurement in advance.

A storage circuit 7 has stored therein a speed table (speed command values) and various control parameters used when a driven member 6 serving as a load is subjected to position control. The storage circuit 7 outputs them to a microcomputer (a driving control means) 3 in response to a request from the microcomputer 3. The microcomputer 3 reads a program recorded in the storage circuit 7 or on another storage medium and executes the program to perform processing in each embodiment.

The microcomputer 3 compares a command position derived by integrating values in the speed table read from the storage circuit 7 with the current driving position provided from the position counter 1 to perform a proportional, integral, and derivative operation or the like on the deviation of the current position from the command position. The microcomputer 3 increases or decreases the pulse width (duty ratio) of a driving signal supplied to the DC motor 4 to cause the DC motor 4 to follow the speed command values in the speed table.

In FIG. 2, reference numerals 1 and 2 show the position counter and the rotary encoder, respectively, 3 the microcomputer, and 4 the DC motor, as in FIG. 1. Reference numeral 11 shows a speed table storage section for storing the speed table in the storage circuit 7, 12 an integrating circuit, 13 a differentiating circuit, 14 an integrating circuit, 15 a proportional gain circuit, 16 a derivative gain circuit, 17 an integral gain circuit, 18 a play amount storage section for storing data about the mechanical play amount of the gear train 5 in the storage circuit 7, 19 a constant storage section of a memory in the microcomputer, 20 a switch, 21 a target position storage section for storing data about a target position in the storage circuit 7, 22 an adder which adds outputs from the proportional gain circuit 15, the derivative gain circuit 16, and the switch 20, 23 a PWM driver, 24 a subtracter which subtracts an output from the position counter 1 from the data about the target position read from the target position storage section 21, 25 subtracter which subtracts the data about the play amount read from the play amount storage section 18 from an output of the subtracter 24, and 26 a subtracter which subtracts an output of the position counter 1 from an output of the integral circuit 12.

Letter A shows data about a command position derived by the integrating circuit 12 integrating values in the speed table read from the speed table storage section 11, B data about the current driving position (hereinafter referred to as "the current position") of the DC motor 4 derived from outputs of the encoder 2 and the position counter 1, C data about the target position previously stored in the target position storage section 21, and D data about the mechanical play amount in the gear train 5 previously stored in the play amount storage section 8.

A PID operation unit provides a control output in accordance with a deviation of the command position A from the current position B. A P (Proportional) operation section is formed of the proportional gain circuit 15, a D (Derivative) operation section is formed of the differentiating circuit 13 and the derivative gain circuit 16, and an I (Integral) operation section is formed of the integrating circuit 14 and the integral gain circuit 17.

Figure 3:
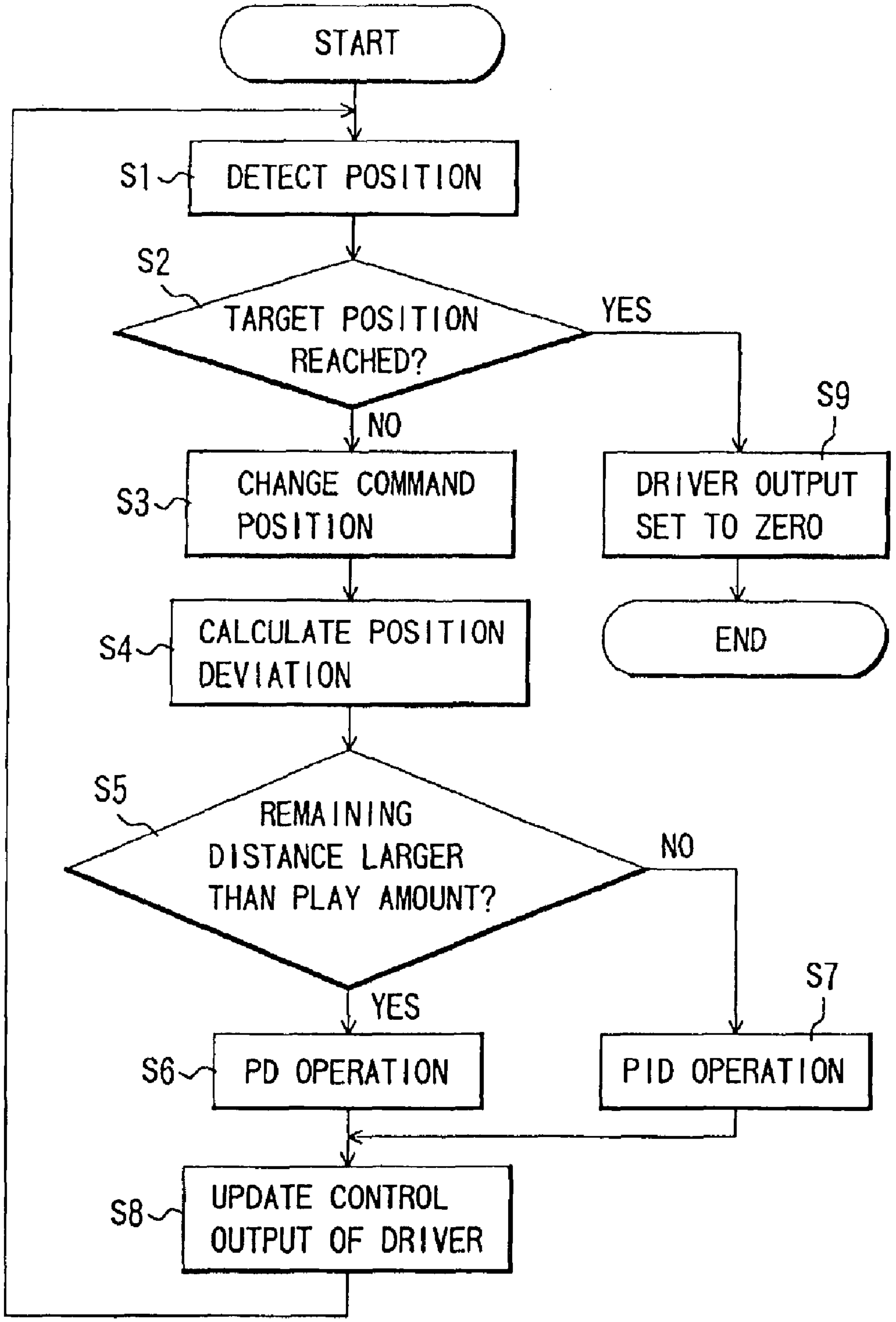
FIG. 3 is a flow chart showing the details of control performed by the position control system of the first embodiment.

FIG. 3 shows a flow chart illustrating details of control performed by the microcomputer 3. A step is abbreviated as "S" in FIG. 3.

At step 1, the microcomputer 3 detects the current position B of the DC motor 4 based on the outputs from the rotary encoder 2 and the position counter 1.

At step 2, the microcomputer 3 compares the current position B with the target position C to determine whether or not the current position B reaches the target position C. If not, the flow proceeds to step 3.

At step 3, the microcomputer 3 reads the speed value corresponding to the driving time from the speed table, and the integral circuit 12 calculates the integral, and sets the resultant value as the command position A (updates the command position A).

At step 4, the subtracter 26 calculates the deviation of the current position B from the command position A set at step 3 and stores the resultant value in a memory, not shown, in the microcomputer 3.

At step 5, the microcomputer 3 determines whether or not the remaining driving amount from the current position B to the target position C (C-B) is larger than the play amount D stored in the play amount storage section 18. If it is larger, the flow proceeds to step 6, or to step 7 if not.

At step 6, the adder 22 adds the outputs from the P operation section (15) and the D operation section (13, 16) to the constant 0 stored in the constant storage section 19 to produce a speed command signal, after the value stored in the memory at step 4 is supplied thereto as an input value.

At step 7, the adder 22 adds all the outputs from the P operation section (15), the D operation section (13, 16), and the I operation section (14, 17) to produce a speed command signal.

At step 8, the speed command signal is output to the PWM driver 23 which updates the control signal for the DC motor 4.

Either the value stored in the constant storage section 19 at step 6 or the output from the I operation section (14, 17) at step 7 is selected by the switch 20.

Specifically, the subtracter 24 subtracts the current position B from the target position C to calculate the remaining driving amount (C-B), and the subtracter 25 subtracts the play amount D from the remaining driving amount (C-B), and when the subtraction result is a positive value (when the remaining driving amount (C-B) is larger than the play amount D), the switch 20 is turned to the constant storage circuit 19 to cause the adder 22 to add only the results of the P operation and the D operation. On the other hand, when the subtraction result of the subtracter 25 is a negative value or zero (when the remaining driving amount (C-B) is equal to or smaller than the play amount D), the switch 20 is turned to the I operation section (14, 17) to cause the adder 22 to all the results of the P operation, the D operation, and the I operation.

After the control signal for the DC motor 4 is updated at step 8, the flow returns to step 1. The processing from step 1 to step 8 is repeated until the current position B reaches the target position C. When the current position B reaches the target position C, the flow proceeds from step 2 to step 9.

At step 9, the output to the PWM driver 23 is changed to zero to stop the motor 4.

In this manner, only the PD control is performed without performing the integral control while the remaining driving amount (C-B) is larger than the play amount D in the gear train 5. Since the I control is not performed and the motor 4 causes no vibrations., it is possible to prevent repeated collisions and separations in the play of the gear train 5 and thus prevent significant hunting at the time of stop which would occur due to the influence of such collisions and separations.

Then, the PID control is performed when the remaining driving amount (C-B) becomes smaller than the play amount D in the gear train 5. This can achieve quick convergence at the time of stop. When the remaining driving amount (C-B) is smaller than the play amount D in the gear train 5, there is a slight distance remaining to the target position B from the motor, and the driving speed of the motor is set to be low in the speed table. In other words, the sampling rate for detecting the driving position of the motor is sufficiently high as compared with the driving speed of the motor. Thus, the actual driving position of the motor is not far ahead of the command position derived from the speed table, and even when the integral control is performed, the gain can be increased without causing vibrations.

When a digital circuit is used to realize the integral operation, it is preferable to set an upper limit on the maximum integral value to prevent an overflow.

Figure 9:
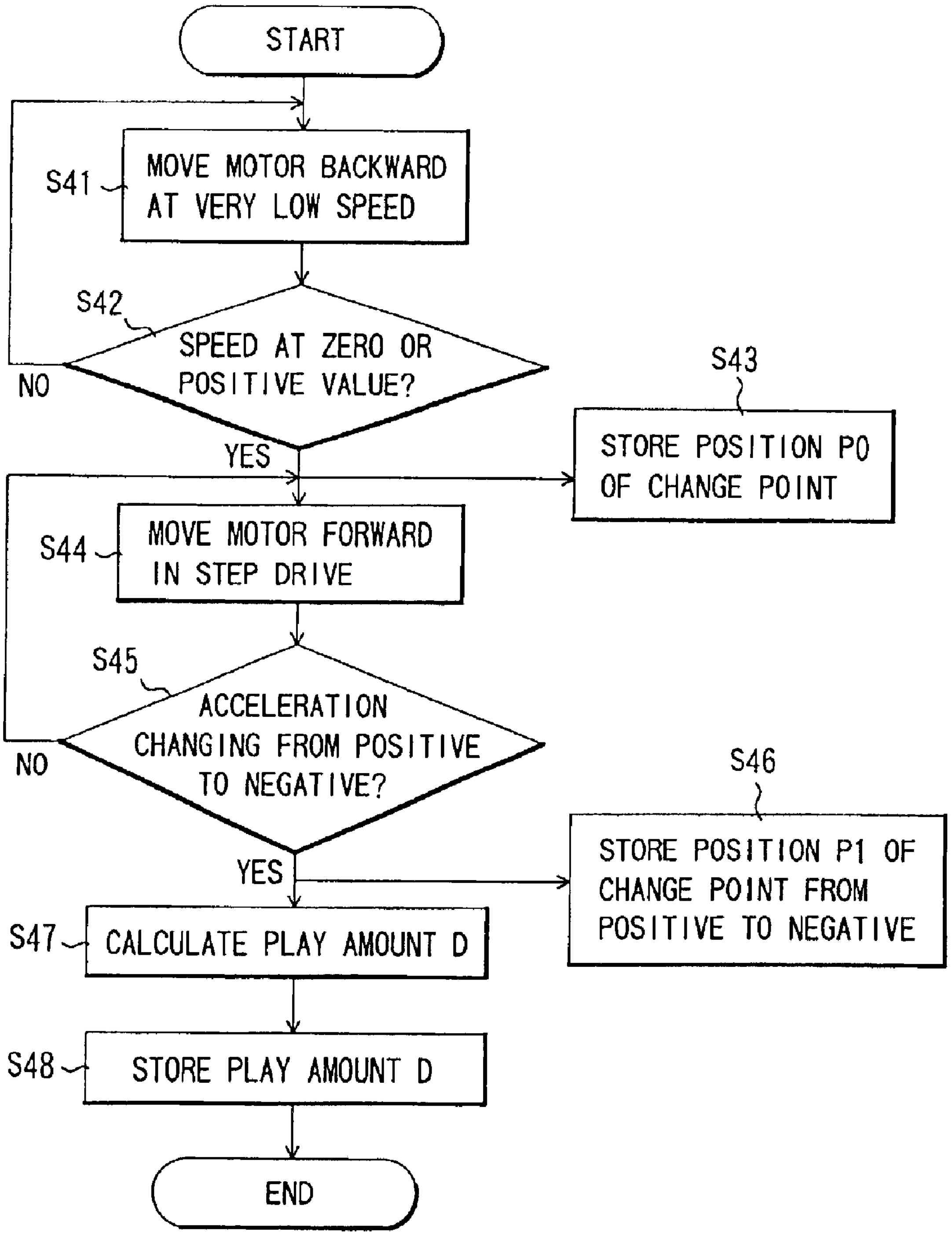
FIG. 9 is a flow chart of detecting the amount of play in the position control system of the first embodiment.

FIG. 9 shows a flow chart illustrating a sequence of detecting the amount of play in the power transmission mechanism such as the gear train 5. The operation in the flow chart has only to be performed at predetermined driving start positions as required, for example, at the time of initialization of the position control apparatus.

At step 41, the microcomputer 3 drives the motor 4 in a direction opposite to the normal forward direction, that is, moves the motor 4 backward, at a very low speed.

At step 42, the microcomputer 3 detects a position at which the speed of the motor is zero since the movement of the motor causes the teeth of the gears in the gear train 5 to collide against the engaging teeth of the gears, or the speed of the motor is reversed from negative to positive since the movement of the motor causes the teeth to collide against and bounce off the engaging teeth (the motor is moved in the normal forward direction). The torque of the motor is set to be low such that only the motor 4 can be driven without driving the load. If the position can be detected, the sequence proceeds to steps 43 and 44. If not, the operation at step 41 is repeated.

At step 43, the storage circuit 7 stores the position detected at step 42 as P0. P0 indicates the position of the play at one end in the power transmission mechanism.

Figure 10:
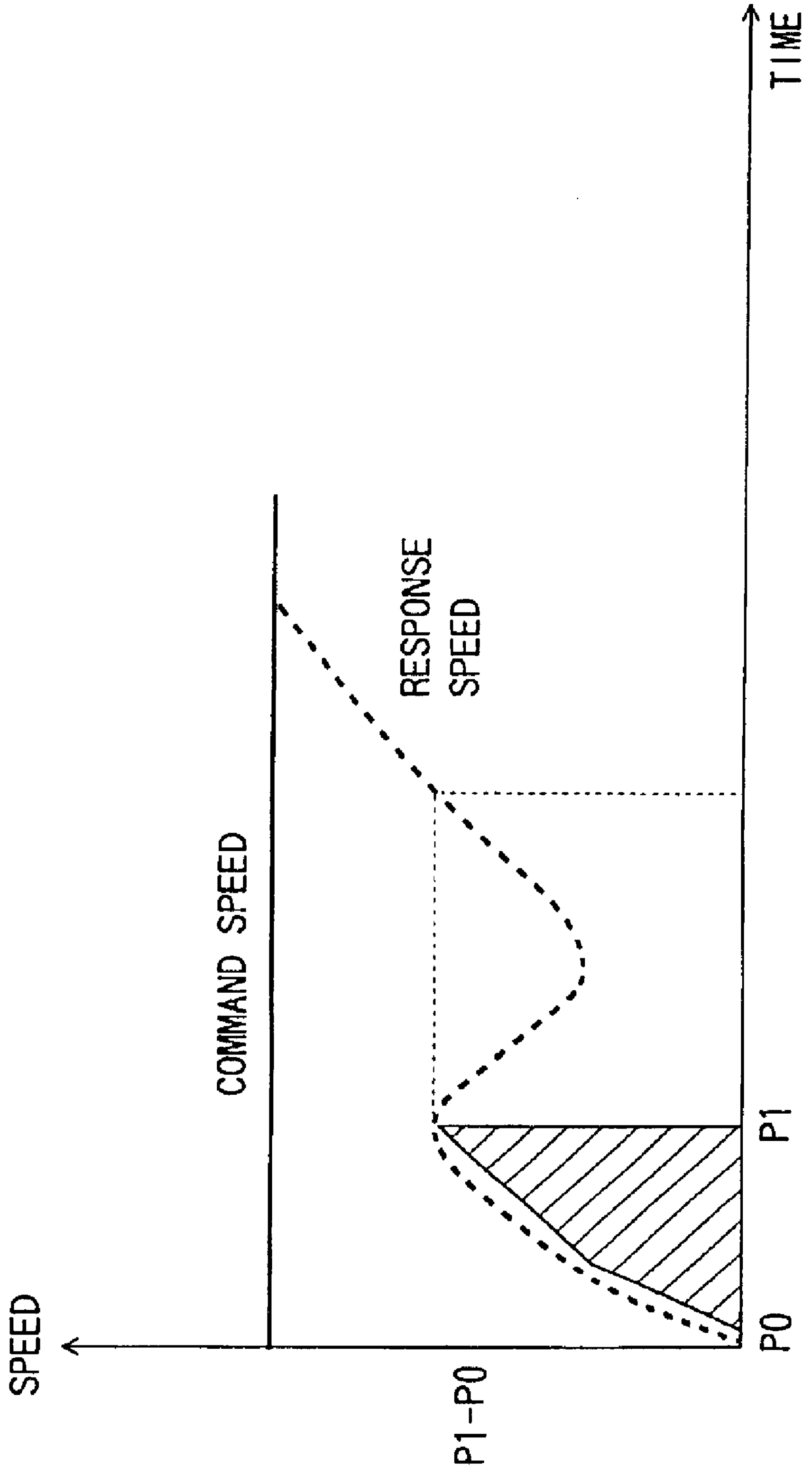
FIG. 10 is a graph for explaining a method of detecting the amount of play in the position control system.

At step 44, the motor 4 is driven in the normal forward direction by supplying a step-shaped driving command suitable for providing torque required to drive the motor 4 and the driven member 6. FIG. 10 shows a change in the speed of the motor 4 in this case.

At step 45, the microcomputer 3 detects a position at which the acceleration of the motor 4 changes from positive to negative since the movement of the motor causes the teeth of the gears to collide against the engaging teeth to start elastic deformation of the power transmission mechanism. If the position can be detected, the sequence proceeds to steps 46 and 47. If not, the operation at step 44 is repeated.

At step 46, the storage circuit 7 stores the position detected at step 45 as P1. P1 indicates the position of the play at the other end when the amount of the play of the power transmission mechanism is maximum.

At step 47, the maximum play amount D of the power transmission mechanism is derived by subtracting P0 from P1.

At step 48, the play amount storage section 18 stores the maximum play amount D derived at step 47.

When a fixing mechanism is used for locking and holding the driven member 6, it is preferable to fix the driven member 6 in advance.

While this embodiment has been described for the use of the DC motor as the driving source, any driving source may be used as long as the driving system is used to drive the driven member through the power transmission mechanism such as the gear train and perform feedback control of the driving source based on the driving position of the output part of the driving source provided by the position sensor.

Figure 4:
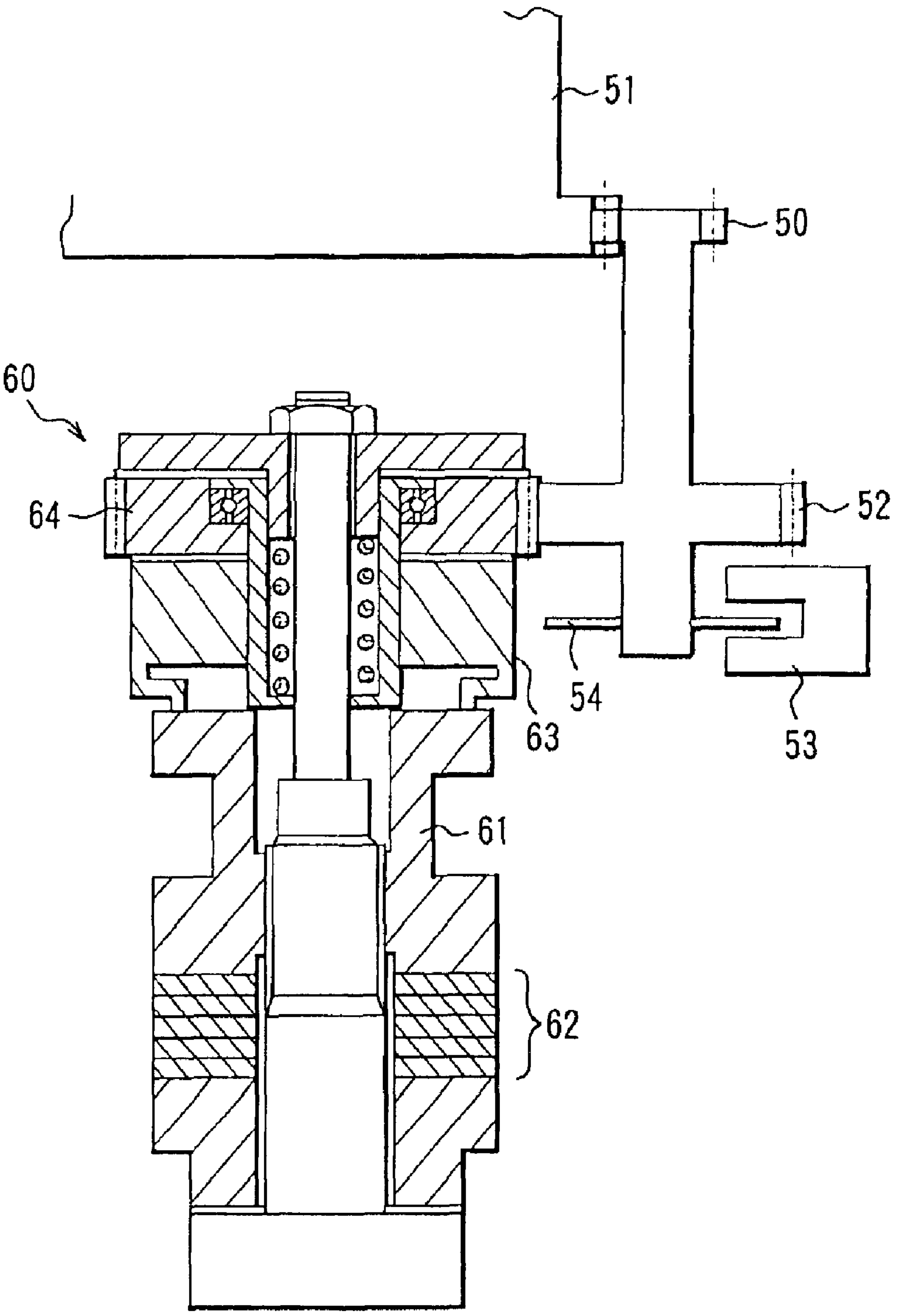
FIG. 4 is a section view of a driving unit for a lens barrel to which the position control system of the first embodiment is applied.

By way of example, FIG. 4 shows a driving unit for a lens barrel of a camera or the like using a vibrating type motor. Reference numeral 60 shows a vibrating type motor of a pencil type, 50 a gear, and 52 a gear. The gear 52 and the gear 50 structure a speed reduction gear train unit (power transmission mechanism). Reference numeral 54 shows a pulse plate, and 53 an encoder formed of a photo interrupter or the like which structures the position detector together with the pulse plate 54. Reference numeral 51 shows a component of the lens barrel serving as the driven member (load) engaged with the gear 50, which is, for example, a cam ring for driving a zoom lens in an optical axis direction.

The vibrating type motor 60 comprises an elastic body 61, a piezoelectric element 62 fixed to the elastic body 61, a rotor 63 in press contact with the end surface of the elastic body 61 by spring force, and a gear 64 rotated with the rotor 63 and engaged with the gear 52. An alternating signal is supplied to the piezoelectric element 62 to produce a traveling-wave at the end surface of the elastic body 61, thereby rotating the rotor 63 in press contact with the end surface of the elastic body 61. The rotation of the rotor 63 is transmitted to the component 51 of the lens barrel through the gear train unit 52 and 50 from the gear 64.

While the vibrating type motor is used in this example, a control method similar to that in the embodiment is also effective since the torque is transmitted through the gear train. When the vibrating type motor is used as the driving source, the driving speed can be controlled by adjusting the pulse width of the alternating signal supplied to the piezoelectric element 62. However, the control of the driving speed by adjusting the frequency of the alternating signal can result in a wider dynamic range.

Figure 5:
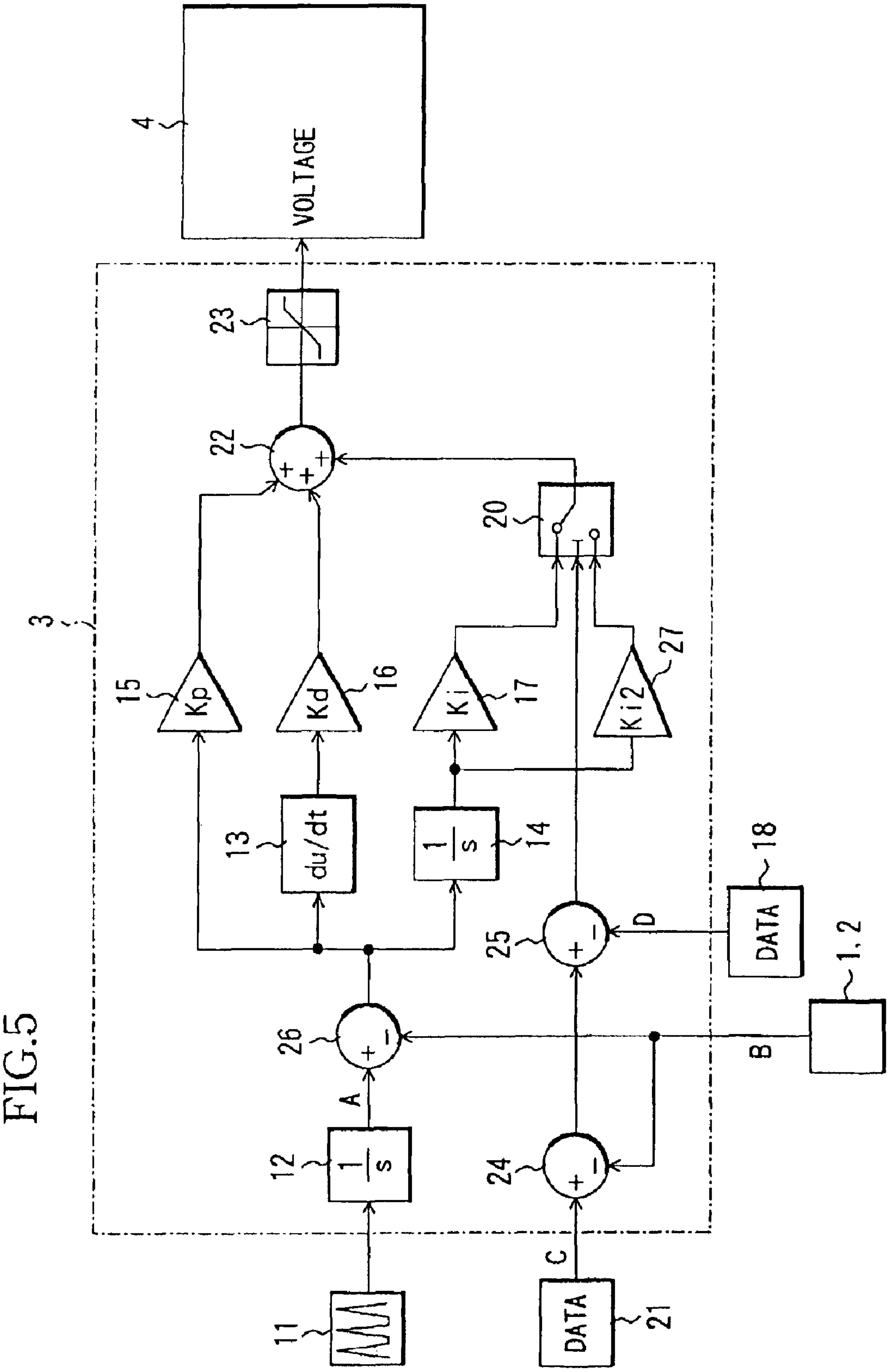
FIG. 5 is a block diagram showing in detail the structure of a position control system which is a second embodiment of the present invention, with a microcomputer shown in particular.

FIG. 5 is a block diagram showing in detail a control circuit of a position control apparatus which is a second embodiment of the present invention, with a microcomputer shown in particular. Components identical to those in the first embodiment are designated with the same reference numerals as in the first embodiment.

In FIG. 5, letter A shows data about a command position derived by an integration circuit 12 integrating values in a speed table read from a speed table storage section 11, B data about the current driving position of a DC motor 4 derived from outputs of an encoder 2 and a position counter 1, C data about a target position previously stored in a target position storage section 20, and D data about a mechanical play amount in a gear train 5 previously stored in a play amount storage section 18, in a manner similar to that in the first embodiment.

A PID operation unit provides a control output in accordance with a deviation of the command position A from the current position B. A P operation section is formed of a proportional gain circuit 15, and a D operation section is formed of a differentiating circuit 13 and a derivative gain circuit 16. In the second embodiment, unlike the first embodiment, an I operation section is formed of an integrating circuit 14, an integral gain circuit 17, a second integral gain circuit 27, and a switch 20. The second integral gain circuit 27 has a gain lower than that of the integral gain circuit 17.

Figure 6:
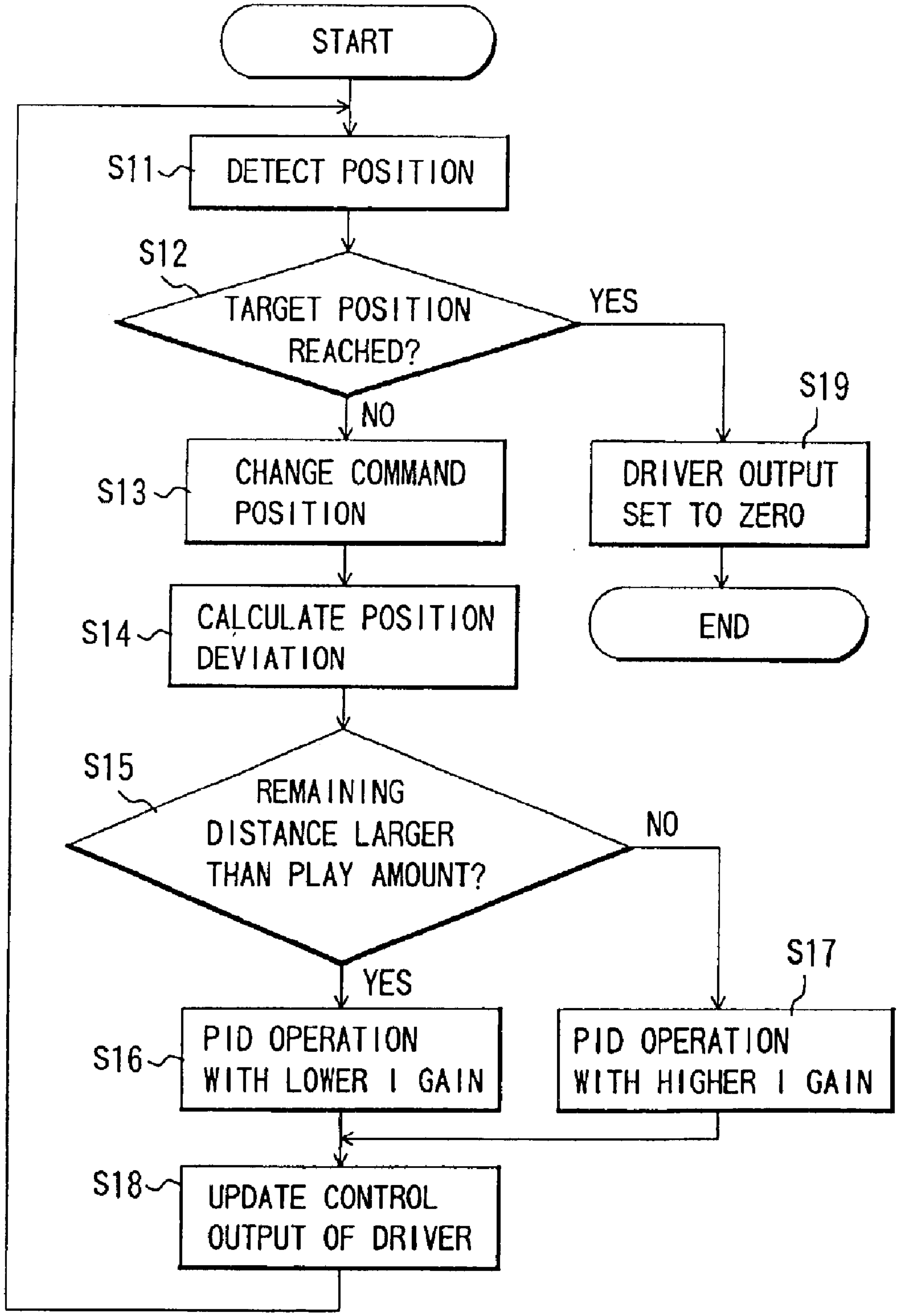
FIG. 6 is a flow chart showing the details of control performed by the position control system of the second embodiment.

FIG. 6 shows a flow chart illustrating details of the control performed by the microcomputer 3.

At step 11, the microcomputer 3 detects the current position B of the DC motor 4 based on the outputs from the rotary encoder 2 and the position counter 1.

At step 12, the microcomputer 3 compares the current position B with the target position C to determine whether or not the current position B reaches the target position C. If not, the flow proceeds to step 13.

At step 13, the microcomputer 3 reads the command position A at a predetermined moving distance away from the current position B from the speed table, calculates the integral, and sets the resultant value as the command position A (updates the command position A).

At step 14, a subtracter 26 calculates the deviation of the current position B from the command position A set at step 13 and stores the resultant value in a memory, not shown, in the microcomputer 3.

At step 15, the microcomputer 3 determines whether or not the remaining driving amount from the current position B to the target position C (C-B) is larger than the play amount D stored in the play amount storage section 18. If it is larger, the flow proceeds to step 16, or to step 17 if not.

At step 16, an adder 23 adds the output from the I operation section (14, 27) using the second integral gain circuit 27 with the lower gain to the outputs from the P operation section (15) and the D operation section (13, 16) to produce a speed command signal, after the value stored in the memory at step 14 is supplied thereto as an input value.

At step 17, the adder 23 adds the output from the I operation section (14, 17) using the integral gain circuit 17 with the higher gain to the outputs from the P operation section (15) and the D operation section (13, 16) to produce a speed command signal, after the value stored in the memory at step 14 is supplied thereto as an input value.

At step 18, the speed command signal is output to the PWM driver 22 which updates the control signal for the DC motor 4.

Either the integral gain circuit 17 or the second integral gain circuit 27 is selected by the switch 20.

Specifically, the subtracter 24 subtracts the current position B from the target position C to calculate the remaining driving amount (C-B), and the subtracter 25 subtracts the play amount D from the remaining driving amount (C-B), and when the subtraction result is a positive value (when the remaining driving amount (C-B) is larger than the play amount D), the switch 20 is turned to the second integral gain circuit 27 to perform integral control with the lower gain than when the remaining driving amount (C-B) is smaller than the play amount D. On the other hand, when the subtraction result of the subtracter 25 is a negative value or zero (when the remaining driving amount (C-B) is equal to or smaller than the play amount D), the switch 20 is turned to the integral gain circuit 17 to perform integral control with the higher gain than when the remaining driving amount (C-B) is larger than the play amount D.

After the control signal for the DC motor 4 is updated at step 18, the flow returns to step 11. The processing from step 11 to step 18 is repeated until the current position B reaches the target position C. When the current position B reaches the target position C, the flow proceeds from step 12 to step 19.

At step 19, the output to the PWM driver is changed to zero to stop the motor 4.

In this manner, the PID control is performed with the lower gain of the I operation section to ensure control allowance while the remaining driving amount (C-B) is larger than the play amount D in the gear train 5. This can reduce the vibrations of the motor 4, and it is possible to prevent repeated collisions and separations in the play between the motor 4 and the gear train 5 and thus prevent significant hunting at the time of stop which would occur due to the influence of such collisions and separations.

In addition, when the remaining driving amount (C-B) becomes smaller than the play amount D in the gear train 5, the PID control is performed with the higher gain of the I operation section. This can achieve quick convergence at the time of stop similarly to the first embodiment. The sampling rate for detecting the driving position of the motor is sufficiently high as compared with the driving speed of the motor at this point. Thus, the actual driving position of the motor is not far ahead of the command position derived from the speed table, and even when the integral control is performed, the gain can be increased without causing vibrations.

Figure 7:
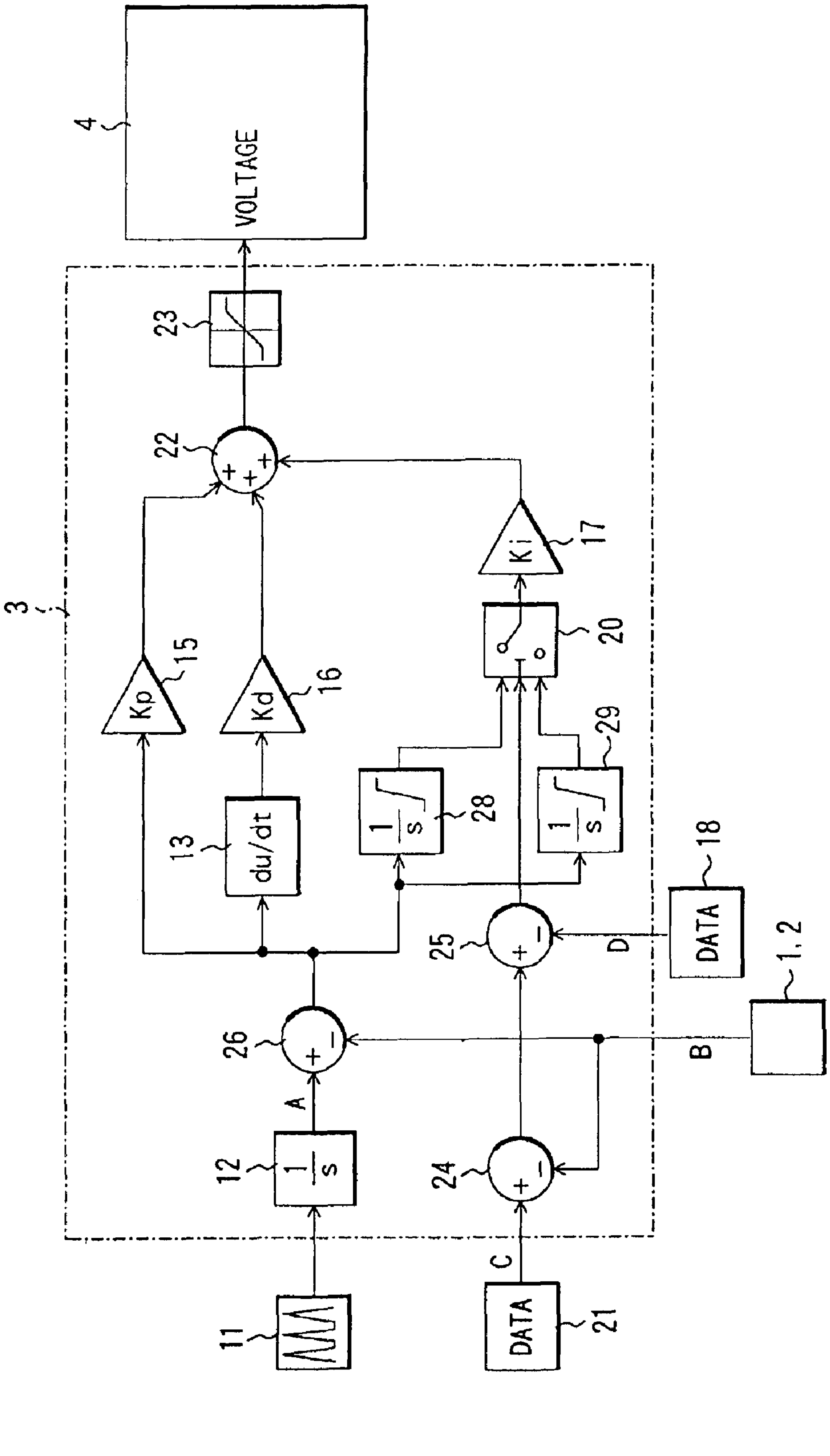

FIG. 7 is a block diagram showing in detail a control circuit of a position control system which is a third embodiment of the present invention, with a microcomputer shown in particular. Components identical to those in the first embodiment are designated with the same reference numerals as in the first embodiment.

In FIG. 7, letter A shows data about a command position derived by an integrating circuit 12 integrating values in a speed table read from a speed table storage section 11, B data about the current driving position of a DC motor 4 derived from outputs of an encoder 2 and a position counter 1, C data about a target position previously stored in a target position storage section 20, and D data about a mechanical play amount in a gear train 5 previously stored in a play amount storage section 18, in a manner similar to that in the first embodiment.

A PID operation unit provides a control output in accordance with a deviation of the command position A from the current position B. A P operation section is formed of a proportional gain circuit 15, and a D operation section is formed of a differentiating circuit 13 and a derivative gain circuit 16. In the third embodiment, unlike the first and second embodiments, an I operation section is formed of an integral circuit 28, a second integral circuit 29, a switch 20, and an integral gain circuit 17. The second integral circuit 29 has a lower upper limit in the I operation section than that of the integral circuit 28.

Figure 8:
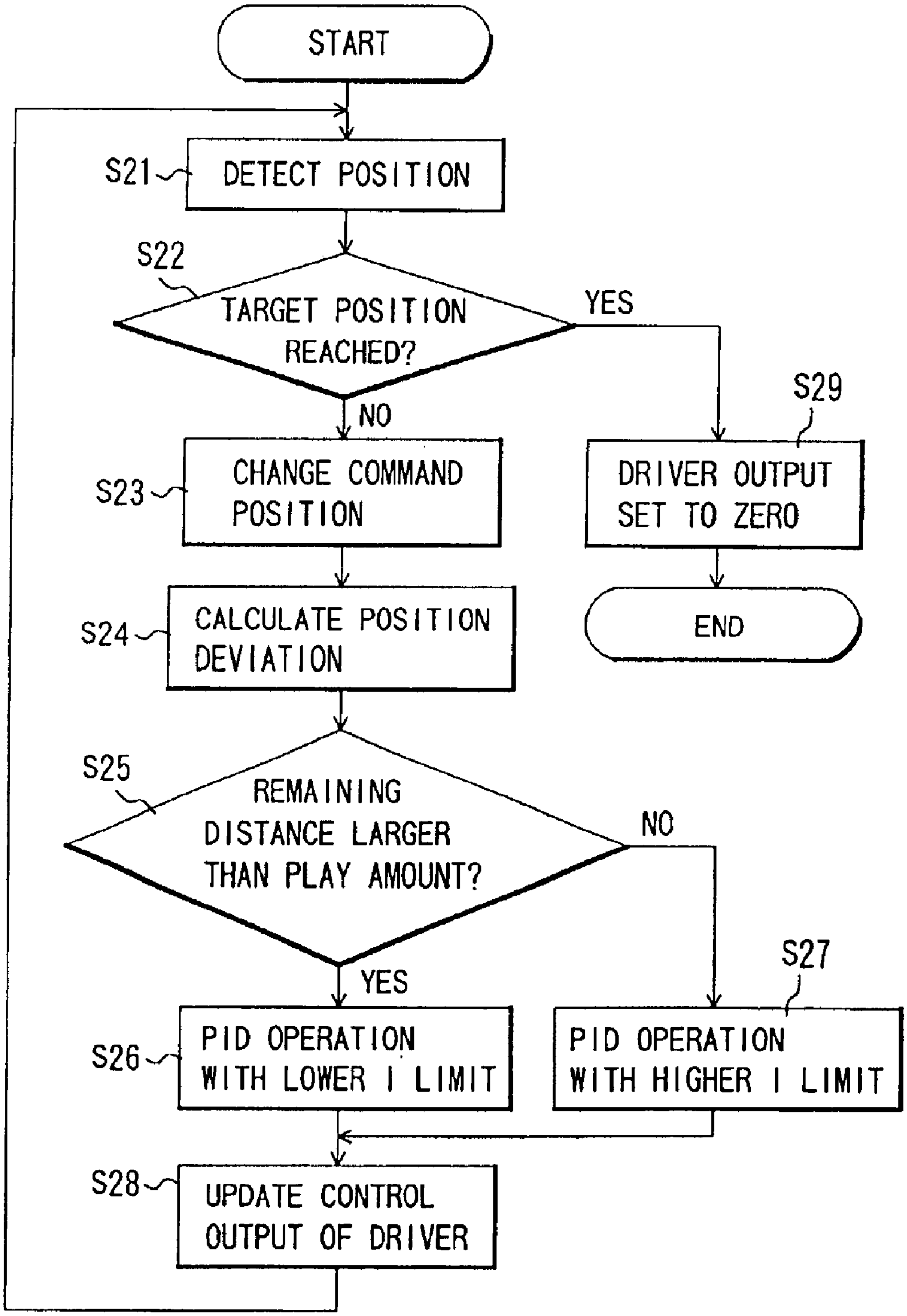
FIG. 8 is a flow chart showing the details of control performed by the position control system of the third embodiment.

FIG. 8 shows a flow chart illustrating details of the control performed by the microcomputer 3.

At step 21, the microcomputer 3 detects the current position B of the DC motor 4 based on the outputs from the rotary encoder 2 and the position counter 1.

At step 22, the microcomputer 3 compares the current position B with the target position C to determine whether or not the current position B reaches the target position C. If not, the flow proceeds to step 23.

At step 23, the microcomputer 3 reads the command position A at a predetermined moving distance away from the current position B from the speed table, calculates the integral, and sets the resultant value as the command position A (updates the command position A).

At step 24, a subtracter 26 calculates the deviation of the current position B from the command position A set at step 23 and stores the resultant value in a memory, not shown, in the microcomputer 3.

At step 25, the microcomputer 3 determines whether or not the remaining driving amount from the current position B to the target position C (C-B) is larger than the play amount D stored in the play amount storage section 18. If it is larger, the flow proceeds to step 26, or to step 27 if not.

At step 26, an adder 23 adds the output from the I operation section (29, 20, 17) using the second integral circuit 29 with the lower upper limit in the I operation section to the outputs from the P operation section (15) and the D operation section (13, 16) to produce a speed command signal, after the value stored in the memory at step 24 is supplied thereto as an input value.

At step 27, the adder 23 adds the output from the I operation section (28, 20, 17) using the integral circuit 28 with the higher upper limit in the I operation section to the outputs from the P operation section (15) and the D operation section (13, 16) to produce a speed command signal, after the value stored in the memory at step 24 is supplied thereto as an input value.

At step 28, the speed command signal is output to the PWM driver 22 which updates the control signal for the DC motor 4.

Either the integral circuit 28 or the second integral circuit 29 is selected by the switch 20.

Specifically, the subtracter 24 subtracts the current position B from the target position C to calculate the remaining driving amount (C-B), and the subtracter 25 subtracts the play amount D from the remaining driving amount (C-B), and when the subtraction result is a positive value (when the remaining driving amount (C-B) is larger than the play amount D), the switch 20 is turned to the second integral circuit 29 to perform integral control with the lower upper limit on the I operation than when the remaining driving amount (C-B) is smaller than the play amount D. On the other hand, when the subtraction result of the subtracter 25 is a negative value or zero (when the remaining driving amount (C-B) is equal to or smaller than the play amount D), the switch 20 is turned to the integral circuit 28 to perform integral control with the higher upper limit on the I operation than when the remaining driving amount (C-B) is larger than the play amount D.

After the control signal for the DC motor 4 is updated at step 28, the flow returns to step 21. The processing from step 21 to step 28 is repeated until the current position B reaches the target position C. When the current position B reaches the target position C, the flow proceeds from step 22 to step 29.

At step 29, the output to the PWM driver is changed to zero to stop the motor 4.

In this manner, the PID control is performed with the lower upper limit on the I operation while the remaining driving amount (C-B) is larger than the play amount D in the gear train 5. With this control, the motor 4 is unlikely to cause an overshoot, that is, to cause vibrations. It is thus possible to prevent repeated collisions and separations in the play of the gear train 5 and thus prevent large hunting at the time of stop which would occur due to the influence of such collisions and separations.

When the remaining driving amount (C-B) becomes smaller than the play amount D in the gear train 5, the PID control is performed with the higher upper limit on the I operation. This can achieve quick convergence at the time of stop similarly to the first embodiment. The sampling rate for detecting the driving position of the motor is sufficiently high as compared with the driving speed of the motor at this point. Thus, the actual driving position of the motor is not far ahead of the command position derived from the speed table, and even when the integral control is performed, the gain can be increased without causing vibrations.

Figure 11:
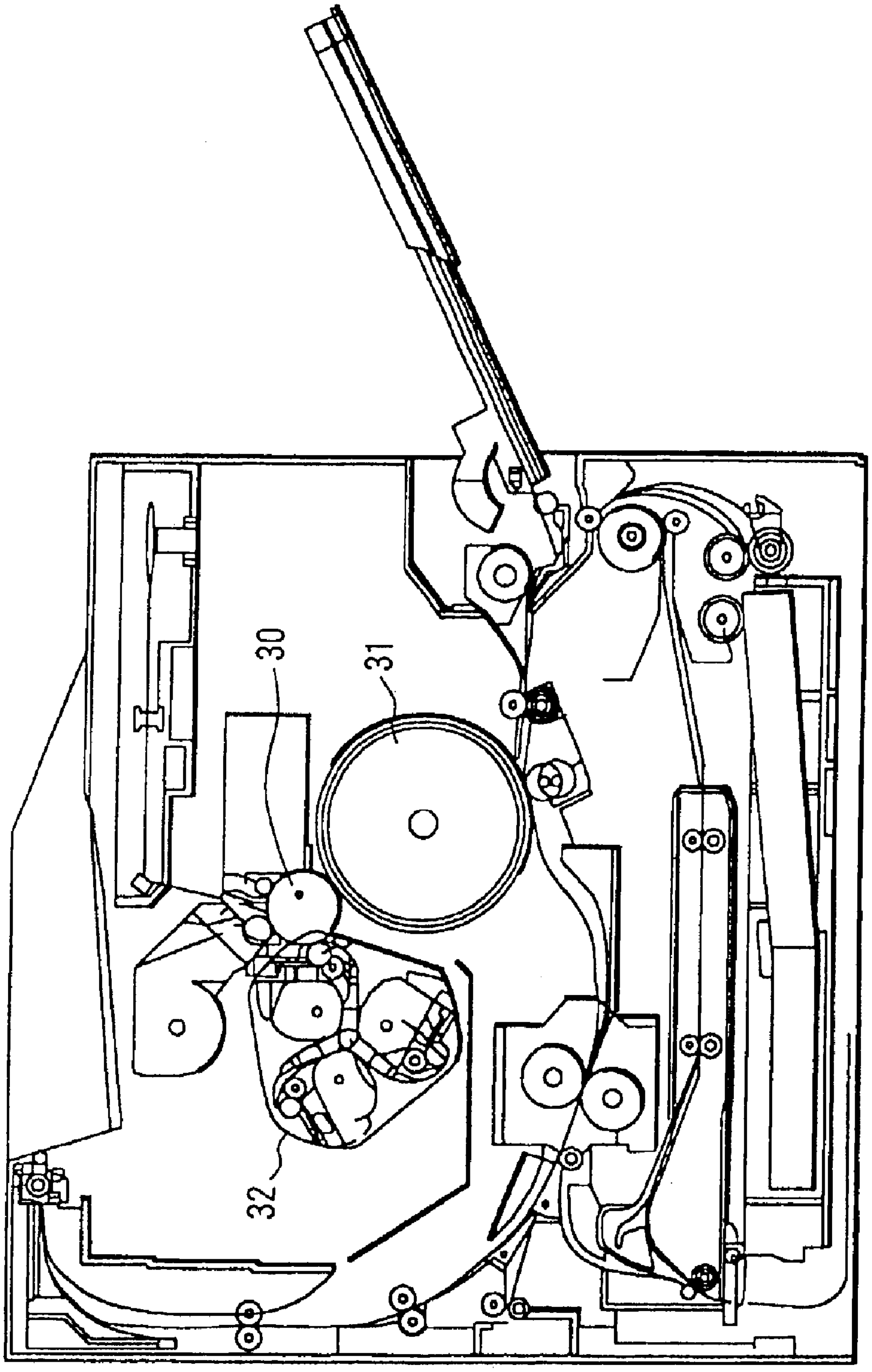
FIG. 11 is a section view of a multicolor image forming apparatus which is a fourth embodiment of the present invention, to which the position control system of each of the first to third embodiments is applied.

FIG. 11 shows the structure of a multicolor image forming apparatus which comprises the position control system described above. Reference numeral 30 shows a photoconductive drum which is exposed to laser light or the like on its surface to form a latent image, 32 a rotation type developer unit which applies developers for different colors in turn to the latent image formed on the photoconductive drum 30 to develop a visible image, and 31 an intermediate transfer drum which transfers the single color visible image developed by the rotation type developer unit 32 to a recording sheet and superposes the visible images of different colors to form a colored image.

The position control system described above is effective in a system in which a driven member has large inertia and a power transmission mechanism has large play. In FIG. 11, the rotation type development unit 32, the photoconductive drum 30, and the intermediate transfer drum 31 each correspond to the driven member.

Figure 12:
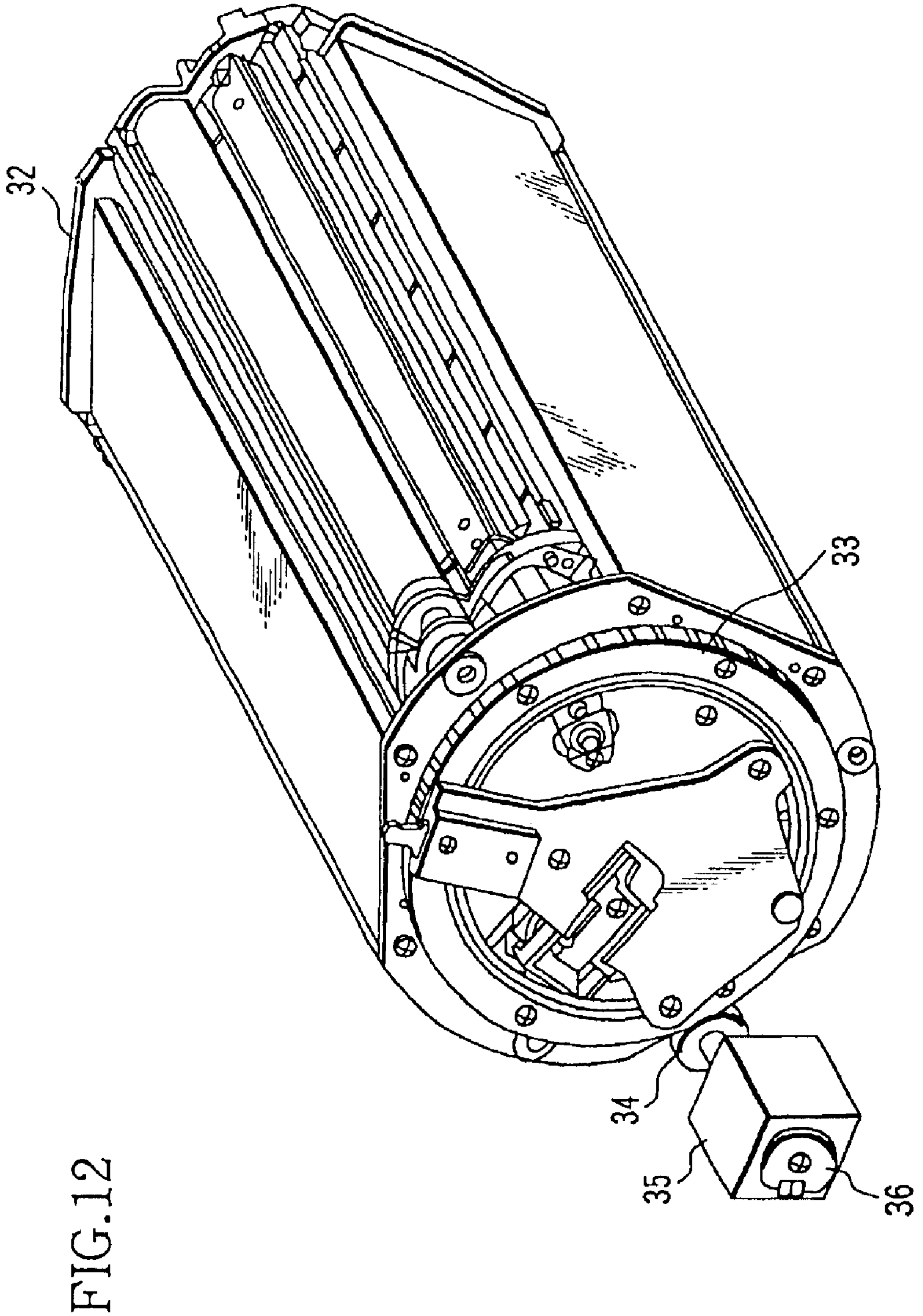
FIG. 12 shows a rotation type developer unit of the multicolor image forming apparatus.

FIG. 12 is a partially enlarged view of the rotation type developer unit 32 shown in FIG. 11. A rotary encoder 36 is directly connected to a DC motor 35 serving as the driving source to allow detection of the position of the DC motor 35.

The driving force of the motor is transferred to the rotation type developer unit 32 serving as the driven member through gear trains 33 and 34 (the power transmission mechanism).

The rotation type developer unit 32 is structured to hold cartridges containing the developers for different colors, and is positioned to development points in a predetermined order of colors.

Figure 13:
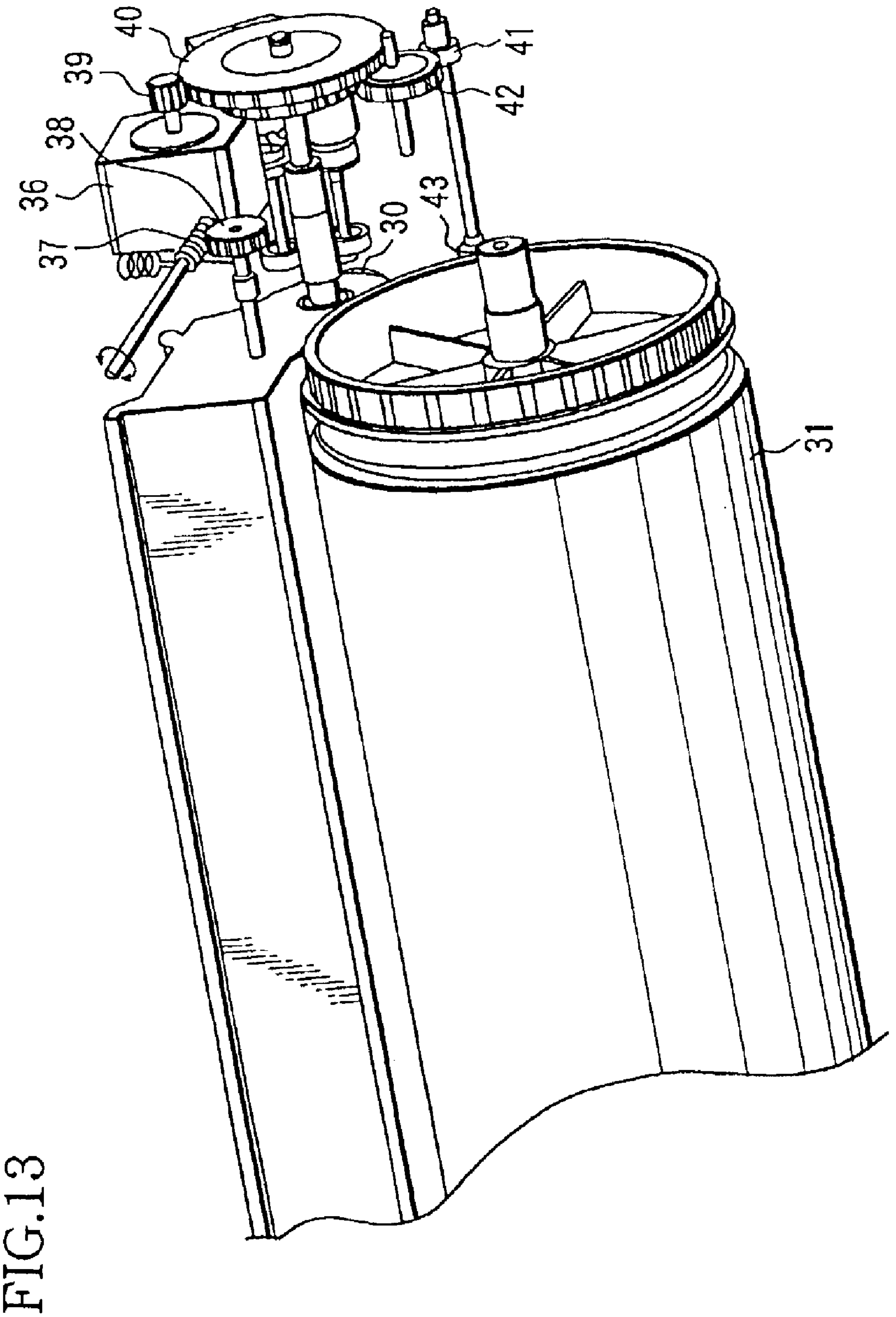
FIG. 13 shows a photoconductive drum and an intermediate transfer drum of the multicolor image forming apparatus.

FIG. 13 is a partially enlarged view of the photoconductive drum 30 and the intermediate transfer drum 31 shown in FIG. 11. Driving force from a motor 35 is transferred to the photoconductive drum 30 and the intermediate transfer drum 31 through gear trains 37 to 43.

The gear train 40 is structured as a multi-stage gear train to allocate the power to the two loads of the photoconductive drum 30 and the intermediate transfer drum 31.

Since the rotation type developer unit 32 has a large moment of inertia, and the gear trains are formed in many stages and provide a large reduction ratio, the play amount is at a large value viewed from the encoder 36.

Therefore, the position control method described above is significantly effective in positioning these driving system for finding the start position or the like.

While the aforementioned embodiment has been described for the application of the position control method according to each of the embodiments of the present invention to the driving system for the lens barrel or the image forming apparatus, the position control method is applicable to various apparatuses having a driving system which transmits driving force of a driving source to a driven member through a power transmission mechanism, not limited to the aforementioned ones.

In addition, the present invention is realized with a program for performing the embodiments, and with a storage medium which has the program stored thereon.

While preferred the embodiment has been described, it is to be understood that modification and variation of the present invention may be made without departing from scope of the following claims.

What is claimed is:

1. A position control method for use in a driving apparatus comprising a driving source which drives a driven member through a power transmission mechanism and a position detection circuit which detects a driving position of the driving source and outputting a speed command value to the driving source to perform speed control, the method of performing control such that the position detected by the position detection circuit reaches a target position, the method comprising the steps of:

comparing a remaining driving amount of the driving source to the target position with an amount of a mechanical dead zone of the power transmission mechanism;

controlling the position of the driving source by performing a proportional and derivative operation on a deviation of the position detected by the position detection circuit from a command position obtained on the basis of the speed command value while the remaining driving amount is larger than the amount of the mechanical dead zone of the power transmission mechanism; and controlling the position of the driving source by performing a proportional, integral, and derivative operation on the deviation of the position detected by the position detection circuit from the command position derived on the basis of the speed command value when the remaining driving amount becomes smaller than the amount of the mechanical dead zone of the power transmission mechanism.

2. The position control method according to claim 1, wherein the amount of the mechanical dead zone is obtained in advance on the basis of a difference between a position detected by the position detection circuit when the driving source is driven in advance such that the amount of the mechanical dead zone is at the maximum and a position detected by the position detection circuit when the driving source is driven such that the mechanical dead zone is eliminated, the obtained amount of mechanical dead zone is stored, and the stored amount of mechanical dead zone is compared with the remaining driving amount of the driving source to the target position.

3. A position control method for use in a driving apparatus comprising a driving source which drives a driven member through a power transmission mechanism and a position detection circuit which detects a driving position of the driving source and outputting a speed command value to the driving source to perform speed control, the method of performing control such that the position detected by the position detection circuit reaches a target position, the method comprising the steps of:

comparing a remaining driving amount of the driving source to the target position with an amount of a mechanical dead zone of the power transmission mechanism; and controlling the position of the driving source by performing a proportional, integral, and derivative operation on a deviation of the position detected by the position detection circuit from a command position obtained on the basis of the speed command value, wherein a gain of an integral value when the remaining driving amount is smaller than the amount of the mechanical dead zone of the power transmission mechanism is set to be higher than when the remaining driving amount is larger than the amount of the mechanical dead zone of the power transmission mechanism.

4. The position control method according to claim 3, wherein the mechanical dead zone is obtained in advance on the basis of a difference between a position detected by the position detection circuit when the driving source is driven in advance such that the amount of the mechanical dead zone is at the maximum and a position detected by the position detection circuit when the driving source is driven such that the mechanical dead zone is eliminated, the obtained amount of the mechanical dead zone is stored, and the stored amount of the mechanical dead zone is compared with the remaining driving amount of the driving source to the target position.

5. A position control method for use in a driving apparatus comprising a driving source which drives a driven member through a power transmission mechanism and a position detection circuit which detects a driving position of the driving source and outputting a speed command value to the driving source to perform speed control, the method of performing control such that the position detected by the position detection circuit reaches a target position, the method comprising the steps of:

comparing a remaining driving amount of the driving source to the target position with an amount of a mechanical dead zone of the power transmission mechanism; and controlling the position of the driving source by performing a proportional, integral, and derivative operation on a deviation of the position detected by the position detection circuit from a command position obtained on the basis of the speed command value and by setting an upper limit on an integral value, wherein the upper limit on the integral value when the remaining driving amount is smaller than the amount of the mechanical dead zone of the power transmission mechanism is set to be higher than when the remaining driving amount is larger than the amount of the mechanical dead zone of the power transmission mechanism.

6. The position control method according to claim 5, wherein the mechanical dead zone is obtained on the basis of a difference between a position detected by the position detection circuit when the driving source is driven in advance such that the amount of the mechanical dead zone is at the maximum and a position detected by the position detection circuit when the driving source is driven such that the mechanical dead zone is eliminated, the derived amount of the mechanical dead zone is stored, and the stored amount of the mechanical dead zone is compared with the remaining driving amount of the driving source to the target position.

7. A position control method for use in a driving apparatus comprising a driving source which drives a driven member through a power transmission mechanism and a position detection circuit which detects a driving position of said driving source and outputting a speed command value to the driving source to perform speed control, the method of performing control such that the position detected by the position detection circuit reaches a target position, the method comprising the steps of:

updating a command value obtained on the basis of the speed command value;

comparing a remaining driving amount of the driving source to the target position with an amount of a mechanical dead zone of the power transmission mechanism;

controlling the position of the driving source by performing a proportional and derivative operation on a deviation of the position detected by the position detection circuit from the command position obtained on the basis of the speed command value while the remaining driving amount is larger than the amount of the mechanical dead zone of the power transmission mechanism; and controlling the position of the driving source by performing a proportional, integral, and derivative operation on the deviation of the position detected by the position detection circuit from the command position obtained on the basis of the speed command value when the remaining driving amount becomes smaller than the mechanical dead zone of the power transmission mechanism.

8. A position control method for use in a driving apparatus comprising a driving source which drives a driven member through a power transmission mechanism and a position detection circuit which detects a driving position of the driving source and outputting a speed command value to the driving source to perform speed control, the method of performing control such that the position detected by the position detection circuit reaches a target position, the method comprising the steps of:

updating a command value obtained on the basis of the speed command value;

comparing a remaining driving amount of the driving source to the target position with an amount of a mechanical dead zone of the power transmission mechanism;

controlling the position of the driving source by performing a proportional, integral, and derivative operation on a deviation of the position detected by the position detection circuit from the command position obtained on the basis of the speed command value, wherein a gain of an integral value when the remaining driving amount is smaller than the amount of the mechanical dead zone of the power transmission mechanism is set to be higher than when the remaining driving amount is larger than the amount of the mechanical dead zone of the power transmission mechanism.

9. A position control method for use in a driving apparatus comprising a driving source which drives a driven member through a power transmission mechanism and a position detection circuit which detects a driving position of the driving source and outputting a speed command value to the driving source to perform speed control, the method of performing control such that the position detected by the position detection circuit reaches a target position, the method comprising the steps of:

updating a command value obtained on the basis of the speed command value;

comparing a remaining driving amount of the driving source to the target position with an amount of a mechanical dead zone of the power transmission mechanism;

controlling the position of the driving source by performing a proportional, integral, and derivative operation on a deviation of the position detected by the position detection circuit from a command position obtained on the basis of the speed command value and by setting an upper limit on an integral value, wherein the upper limit on the integral value when the remaining driving amount is smaller than the amount of the mechanical dead zone of the power transmission mechanism is set to be higher than when the remaining driving amount is larger than the amount of the mechanical dead zone of the power transmission mechanism.

10. A position control system comprising:

a driving source;

a power transmission member which transmits an output from the driving source to a driven member;

a position detection circuit which detects a driving position of the driving source; and driving control unit controlling the position of the driving source such that the position detected by the position detection circuit reaches a target position by performing speed control of the driving source, with a speed command value wherein the driving control unit has an operation unit capable of performing a proportional operation, an integral operation, and a derivative operation, and controls the position of the driving source by a proportional and derivative operation on a deviation of the position detected by the position detection circuit from a command position obtained on the basis of the speed command value while a remaining driving amount to the target position is larger than an amount of a mechanical dead zone of the power transmission mechanism, and controls thereof by performing a proportional, integral, and derivative operation when the remaining driving amount becomes smaller than the amount of the mechanical dead zone of the power transmission mechanism.

11. The position control system according to claim 10, wherein the driving control unit clears the result of the integral operation when the remaining amount to the target position is larger than the amount of the mechanical dead zone of the power transmission mechanism.

12. The position control system according to claim 10, wherein the driving control unit obtains the amount of the mechanical dead zone on the basis of a difference between a position detected by the position detection circuit when the driving source is driven in advance such that the amount of the mechanical dead zone is at the maximum and a position detected by the position detection circuit when the driving source is driven such that the amount of the mechanical dead zone is eliminated, and stores the obtained amount of the mechanical dead zone in a storage circuit.

13. A position control system comprising:

a driving source;

a power transmission member which transmits an output from the driving source to a driven member;

a position detection circuit which detects a driving position of the driving source; and driving control unit controlling the position of the driving source such that the position detected by the position detection circuit reaches a target position by performing speed control of the driving source, with a speed command value wherein the driving control unit has an operation unit capable of performing a proportional operation, an integral operation, and a derivative operation, and performs the position control by performing a proportional, integral, and derivative operation on a deviation of the position detected by the position detection circuit from a command position obtained on the basis of the speed command value, and sets a gain of an integral value when a remaining driving amount to the target position is smaller than an amount of a mechanical dead zone of the power transmission mechanism to be higher than when the remaining driving amount is larger than the amount of the mechanical dead zone of the power transmission mechanism.

14. The position control system according to claim 13, wherein the driving control unit obtains the mechanical dead zone on the basis of a difference between a position detected by the position detection circuit when the driving source is driven in advance such that the amount of the mechanical dead zone is at the maximum and a position detected by the position detection circuit when the driving source is driven such that the mechanical dead zone is eliminated, and stores the obtained amount of the mechanical dead zone in a storage circuit.

15. A position control system comprising:

a driving source;

a power transmission member which transmits an output from the driving source to a driven member;

a position detection circuit which detects a driving position of the driving source; and driving control unit for controlling the position of the driving source such that the position detected by the position detection circuit reaches a target position by performing speed control of the driving source with a speed command value, wherein the driving control unit has an operation unit capable of performing a proportional operation, an integral operation, and a derivative operation, performs the position control by performing a proportional, integral, and derivative operation on a deviation of the position detected by the position detection circuit from a command position obtained on the basis of the speed command value, and sets an upper limit on an integral value, and sets the upper limit on the integral value when a remaining driving amount to the target position is smaller than an amount of a mechanical dead zone of the power transmission mechanism is set to be higher than when the remaining driving amount is larger than the amount of the mechanical dead zone of the power transmission mechanism.

16. The position control system according to claim 15, wherein the driving control unit obtains the amount of the mechanical dead zone on the basis of a difference between position detected by the position detection circuit when the driving source is driven in advance such that the amount of the mechanical dead zone is at the maximum and a position detected by the position detection circuit when the driving source is driven such that the amount of the mechanical dead zone is eliminated, stores the obtained amount of the mechanical dead zone in a storage circuit.

17. A position control system comprising:

a driving source;

a power transmission member which transmits an output from the driving source to a driven member;

a position detection circuit which detects a driving position of the driving source; and driving control unit controlling the position of the driving source such that the position detected by the position detection means reaches a target position by performing speed control of the driving source with a speed command value, wherein the driving control unit has an operation unit capable of performing a proportional operation, an integral operation, and a derivative operation, and sequentially updates a command position obtained on the basis of the speed command value to the target position, and controls the position of the driving source by a proportional and derivative operation on a deviation of the position detected by the position detection circuit from the current command position while a difference between the target position and the current command position is larger than an amount of a mechanical dead zone of the power transmission mechanism, and controls the position thereof by a proportional, integral, and derivative operation when the difference between the target position and the current command position becomes smaller than the amount of the mechanical dead zone of the power transmission mechanism.

18. The position control system according to claim 17, wherein the driving control unit clears the result of the integral operation when the difference between the target position and the current command position is larger than the amount of the mechanical dead zone of the power transmission mechanism.

19. A position control system comprising:

a driving source;

a power transmission member which transmits an output from the driving source to a driven member;

a position detection circuit which detects a driving position of the driving source; and driving control unit for controlling the position of the driving source such that the position detected by the position detection circuit reaches a target position by performing speed control of the driving source with a speed command value, wherein the driving control unit has an operation unit capable of performing a proportional operation, an integral operation, and a derivative operation, sequentially updates a command position obtained on the basis of the speed command value to the target position, and controls the position of the driving source by performing a proportional, integral, and derivative operation on a deviation of the position detected by the position detection circuit from the command position, and sets a gain of an integral value when a difference between the target position and the current command position is smaller than an amount of a mechanical dead zone of the power transmission mechanism to be higher than when the difference between the target position and the current command position is larger than the amount of the mechanical dead zone of the power transmission mechanism.

20. A position control system comprising:

a driving source;

a power transmission member which transmits an output from the driving source to a driven member;

a position detection circuit which detects a driving position of the driving source; and driving control unit controlling the position of the driving source such that the position detected by the position detection circuit reaches a target position by performing speed control of the driving source with a speed command value, wherein the driving control unit has an operation unit capable of performing a proportional operation, an integral operation, and a derivative operation, sequentially updates a command position obtained on the basis of the speed command value to the target position, controls the position of the driving source by performing a proportional, integral, and derivative operation on a deviation of the position detected by the position detection circuit from the command position, and sets an upper limit on an integral value, and sets the upper limit on the integral value when a difference between the target position and the current command position is smaller than an amount of a mechanical dead zone of the power transmission mechanism to be higher than when the difference between the target position and the current command position is larger than the amount of the mechanical dead zone of the power transmission mechanism.

21. An image forming apparatus comprising:

a driving source;

a developer unit;

a power transmission member which transmits an output from the driving source to the developer unit;

a position detection circuit which detects a driving position of the driving source; and a driving control unit for controlling the position of the driving source such that the position detected by the position detection circuit reaches a target position by performing speed control of the driving source with a speed command value, wherein the driving control unit has an operation unit capable of performing a proportional operation, an integral operation, and a derivative operation, and controls the position of the driving source by a proportional and derivative operation on a deviation of the position detected by the position detection circuit from a command position obtained on the basis of the speed command value while a remaining driving amount to the target position is larger than an amount of a mechanical dead zone of the power transmission mechanism, and the position control is performed by performing a proportional, integral, and derivative operation when the remaining driving amount becomes smaller than the amount of the mechanical dead zone of the power transmission mechanism.

22. The image forming apparatus according to claim 21, wherein the driving control unit clears the result of the integral operation when the remaining amount to the target position is larger than the amount of the mechanical dead zone of the power transmission mechanism.

23. An image forming apparatus comprising:

a driving source;

a developer unit;

a power transmission member which transmits an output from the driving source to the developer unit;

a position detection circuit which detects a driving position of the driving source; and driving control unit for controlling the position of the driving source such that the position detected by the position detection circuit reaches a target position by performing speed control of the driving source with a speed command value to perform speed control of the driving source, wherein the driving control unit has an operation unit capable of performing a proportional operation, an integral operation, and a derivative operation, and controls the position of the driving source by performing a proportional, integral, and derivative operation on a deviation of the position detected by the position detection circuit corresponding to a command position obtained on the basis of the speed command value, and a gain of an integral value when a remaining driving amount to the target position is smaller than an amount of a mechanical dead zone of the power transmission mechanism is set to be higher than when the remaining driving amount is larger than the amount of the mechanical dead zone of the power transmission mechanism.

24. An image forming apparatus comprising:

a driving source;

a developer unit;

a power transmission member which transmits an output from the driving source to the developer unit;

a position detection circuit which detects a driving position of the driving source; and driving control unit for controlling the position of the driving source such that the position detected by the position detection circuit reaches a target position by using a speed command value to perform speed control of the driving source, wherein the driving control unit has an operation unit capable of performing a proportional operation, an integral operation, and a derivative operation, controls the position of the driving source by a proportional, integral, and derivative operation on a deviation of the position detected by the position detection circuit from a command position obtained on the basis of the speed command value, and sets an upper limit on an integral value, and sets the upper limit on the integral value when a remaining driving amount to the target position is smaller than an amount of a mechanical dead zone of the power transmission mechanism to be higher than when the remaining driving amount is larger than the amount of the mechanical dead zone of the power transmission mechanism.

25. A program for use in a driving apparatus comprising a driving source which drives a driven member through a power transmission mechanism and a position detection circuit which detects a driving position of the driving source and outputting a speed command value to the driving source to perform speed control, the program for performing control such that the position detected by said position detection circuit reaches a target position, the program comprising the routines of:

comparing a remaining driving amount of the driving source to the target position with an amount of a mechanical dead zone of the power transmission mechanism;

controlling the position of the driving source by performing a proportional and derivative operation on a deviation of the position detected by the position detection circuit from a command position obtained on the basis of the speed command value while said remaining driving amount is larger than the amount of the mechanical dead zone of the power transmission mechanism; and controlling the position of the driving source by performing a proportional, integral, and derivative operation on the deviation of the position detected by the position detection circuit from the command position obtained on the basis of the speed command value when the remaining driving amount becomes smaller than the amount of the mechanical dead zone of the power transmission mechanism.

26. A program for use in a driving apparatus comprising a driving source which drives a driven member through a power transmission mechanism and a position detection circuit which detects a driving position of the driving source and outputting a speed command value to the driving source to perform speed control, the program for performing control such that the position detected by the position detection circuit reaches a target position, the program comprising the routines of:

comparing a remaining driving amount of the driving source to the target position with an amount of a mechanical dead zone of the power transmission mechanism; and controlling the position of the driving source by performing a proportional, integral, and derivative operation on a deviation of the position detected by the position detection circuit from a command position obtained on the basis of the speed command value, wherein a gain of an integral value when the remaining driving amount is smaller than the amount of the mechanical dead zone of the power transmission mechanism is set to be higher than when the remaining driving amount is larger than the amount of the mechanical dead zone of the power transmission mechanism.

27. A program for use in a driving apparatus comprising a driving source which drives a driven member through a power transmission mechanism and a position detection circuit which detects a driving position of the driving source and outputting a speed command value to the driving source to perform speed control, the program for performing control such that the position detected by the position detection circuit reaches a target position, the program comprising the routines of:

comparing a remaining driving amount of the driving source to the target position with an amount of a mechanical dead zone of the power transmission mechanism; and controlling the position of the driving source by performing a proportional, integral, and derivative operation on a deviation of the position detected by the position detection circuit from a command position obtained on the basis of the speed command value and by setting an upper limit on an integral value, wherein the upper limit on the integral value when the remaining driving amount is smaller than the amount of the mechanical dead zone of the power transmission mechanism is set to be higher than when the remaining driving amount is larger than the amount of the mechanical dead zone of the power transmission mechanism.

28. A storage medium having a program stored thereon, the program for use in a driving apparatus comprising a driving source which drives a driven member through a power transmission mechanism and a position detection circuit which detects a driving position of the driving source and outputting a speed command value to the driving source to perform speed control, the program for performing control such that the position detected by the position detection circuit reaches a target position, the program comprising the routines of:

comparing a remaining driving amount of the driving source to the target position with a mechanical dead zone of the power transmission mechanism;

controlling the position of the driving source by performing a proportional and derivative operation on a deviation of the position detected by the position detection circuit from a command position obtained on the basis of the speed command value while the remaining driving amount is larger than the amount of the mechanical dead zone of the power transmission mechanism; and controlling the position of the driving source by performing a proportional, integral, and derivative operation on the deviation of the position detected by the position detection circuit from the command position obtained on the basis of the speed command value when the remaining driving amount becomes smaller than the amount of the mechanical dead zone of the power transmission mechanism.

29. A storage medium having a program stored thereon, the program for use in a driving apparatus comprising a driving source which drives a driven member through a power transmission mechanism and a position detection circuit which detects a driving position of the driving source and outputting a speed command value to the driving source to perform speed control, the program for performing control such that the position detected by the position detection circuit reaches a target position, the program comprising the routines of:

comparing a remaining driving amount of the driving source to the target position with an amount of a mechanical dead zone of the power transmission mechanism; and controlling the position of the driving source by performing a proportional, integral, and derivative operation on a deviation of the position detected by the position detection circuit from a command position obtained on the basis of the speed command value, wherein a gain of an integral value when the remaining driving amount is smaller than the amount of the mechanical dead zone of the power transmission mechanism is set to be higher than when the remaining driving amount is larger than the amount of the mechanical dead zone of the power transmission mechanism.

30. A storage medium having a program stored thereon, the program for use in a driving apparatus comprising a driving source which drives a driven member through a power transmission mechanism and a position detection circuit which detects a driving position of the driving source and outputting a speed command value to the driving source to perform speed control, the program for performing control such that the position detected by the position detection circuit reaches a target position, the program comprising the routines of:

comparing a remaining driving amount of the driving source to the target position with a mechanical dead zone of the power transmission mechanism; and controlling the position of the driving source by performing a proportional, integral, and derivative operation on a deviation of the position detected by the position detection circuit from a command position obtained on the basis of the speed command value and by setting an upper limit on an integral value, wherein the upper limit on the integral value when the remaining driving amount is smaller than the amount of the mechanical dead zone of the power transmission mechanism is set to be higher than when the remaining driving amount is larger than the amount of the mechanical dead zone of the power transmission mechanism.

* * * * *

UNITED STATES PATENT AND TRADEMARK OFFICE

CERTIFICATE OF CORRECTION

PATENT NO. : 6,859,006 B2
DATED : February 22, 2005
INVENTOR(S) : Tadashi Hayashi It is certified that error appears in the above-identified patent and that said Letters Patent is hereby corrected as shown below:

Column 4,
Line 5, after "of" insert -- a position control system which is a third embodiment of the present invention, with a microcomputer shown in particular; --.

Column 6,
Line 42, delete "no vibrations.," and insert -- no vibrations, --.

Signed and Sealed this

Fourteenth Day of March, 2006

JON W. DUDAS
*Director of the United States Patent and Trademark Office*